2,723,244

DIAMINOTRIAZINE-DIAMINE CONDENSATION POLYMERS AND PREPARATION OF SAME

Robert Michael Joyce, Jr., Hockessin, and John Richard Roland, Wilmington, Del., assignors to E. I. du Pont de Nemours & Company, Wilmington, Del., a corporation of Delaware No Drawing. Application January 14, 1952,
Serial No. 266,448

7 Claims. (Cl. 260—2)

This invention relates to condensation polymers and their preparation and, more particularly, to nitrogen-containing polymers adapted to be formed into films and fibers.

Certain condensation polymers have been known for some time and some of them, notably the polyamides and polyesters, have become well established commercially, particularly in the film and fiber fields. These polyamides and polyesters, although outstanding in these fields because of the many desirable physical properties they possess, are rather water insensitive and accordingly are not as readily dyeable or handleable by the normally used aqueous processing treatments as is desired. The relatively long high temperature condensation between complementary polymer-forming ingredients used in preparing the polyamides and polyesters in the molecular weight ranges necessary for desirable polymer properties has in general prevented the modification of their structure to improve the dyeing and aqueous processing characteristics. For instance, it has generally proven unsatisfactory to use complementary polymer forming ingredients carrying other functionalities which would make the polymers formed therefrom dyeable or more water sensitive, since these other functionalities undergo undesirable side reactions at the high temperatures used.

An object of the present invention is to provide a new class of linear condensation polymers and a process of preparing same. A further object is to provide new polymers adapted to be formed into films and filaments and capable of being dyed to deep shades and handled by normally used aqueous processing treatments. Other objects will be apparent from the description of the invention given hereinafter.

The above objects are accomplished according to the present invention by forming linear condensation polymers essentially consisting of intrachain 1,35-triazine nuclei carrying amino nitrogens in the 2 and 4 positions, and divalent organic radicals joining successive nuclei in the polymer chain through the amino nitrogens in the 2 and 4 positions, with the carbon in the 6 position of the 1,3,5-triazine nuclei carrying hydrogen or a monovalent hydrocarbon radical of no more than eight carbons and, preferably, free of aliphatic unsaturation. The divalent organic radicals joining successive nuclei in the polymer chain are preferably hydrocarbon, free of aliphatic unsaturation, and of no more than twelve carbons each.

This new class of polymers essentially consists of intrachain units having the following structural formula:

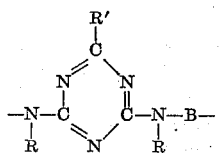

wherein R' and the R's, which are alike or different, are hydrogen or monovalent hydrocarbon radicals usually of no more than eight carbons each; and B is a divalent organic radical free of Zerewitinoff active hydrogen and usually of no more than twelve carbons. The preferred polymers from a standpoint of availability of the necessary intermediates and ease of polymer formation are those of the above structure wherein R' is a monovalent hydrocarbon radical free of aliphatic unsaturation and of no more than four carbons in the case of the wholly aliphatic radicals and eight carbons in the case of the aryl, alkaryl, and aralkyl radicals; the R's which are alike or different, are hydrogen or monovalent hydrocarbon radicals free of aliphatic unsaturation and of no more than four carbons in the case of the wholly aliphatic radicals and eight carbons in the case of the aryl, alkaryl, and aralkyl radicals; and B is a divalent hydrocarbon radical free of aliphatic unsaturation and of no more than twelve carbons.

These new polymers can be conveniently prepared by heating at temperatures of from 100° C. to 300° C. an intimate mixture in approximately equimolar proportions of at least one 1,3,5-triazine having two aminohydrogen-bearing amine groups in the 2 and 4 positions, with at least one organic compound having at least two aminohydrogen-bearing amine groups, at least one of the two said reactant types being present as a hydrohalide salt. It should be noted that this polymer forming reaction is contrary to the general teachings of the condensation art in that the reactants are not complementary, that is, the two reactants used here are both compounds containing at least two aminohydrogen-bearing amine groups. Because of the lack of undesirable cross-linking reactions, it is preferred to use essentially equimolar proportions of diamines and 2,4-diamino-1,3,5-triazines both of which carry only two aminohydrogen-bearing amine groups with the remainder of both types of molecules being free of Zerewitinoff-active hydrogen and, preferably, hydrocarbon free of aliphatic unsaturation, i. e., aliphatically saturated hydrocarbon.

The following examples in which proportions are by weight unless otherwise stated, illustrate specific embodiments of the invention.

Example I

A polymerization reactor is charged with 5.01 parts of hexamethylenediamine dihydrochloride and 4.96 parts (equimolar proportion based on the dihydrochloride) of benzoguanamine. After mixing the two reactants thoroughly, the reaction vessel is evacuated and then blanketed with oxygen-free nitrogen. While maintaining the atmosphere of nitrogen the reactants are heated to 200° C. for 5 hours. The resultant solid is allowed to cool and then treated with warm dilute aqueous hydrochloric acid. The solid is removed by filtration and the filtrate made ammoniacal with aqueous ammonia. No product is recovered from the filtrate. The solid material, insoluble in the dilute aqueous hydrochloric acid, is washed and finally dried. There is thus obtained 4 parts of poly-2,4-hexamethylenediamino-6-phenyl-1,3,5-triazine as a white solid melting at 155° C. and soluble in m-cresol, 99% formic and concentrated sulfuric acids. The molten polymer is very tough and viscous, and clear films can be pressed from the polymer in the molten stage.

*Analysis.*—Calculated for $C_{15}H_{19}N_5$: N, 26.0%. Found: N, 26.5%.

This polymer dyes well and deeply with representative acid dyes. For instance, when dyed at the boil in an aqueous acetic acid solution of a blue acid dyestuff whose recognized foreign prototype is Alizarin Supra Blue A, film samples of this polymer are dyed a deep blue color which is wash-fast as evidenced by no leaching in boiling water for forty minutes.

Example II

A polymerization reactor is charged with an intimate mixture of 7.2 parts of benzoguanamine and 6.97 parts (an equimolar proportion based on the benzoguanamine) of m-phenylenediamine dihydrochloride. The reactor is then purged with oxygen-free nitrogen and the reactants heated for 8 hours at 200° C. while maintaining an oxygen-free nitrogen atmosphere. Upon cooling, there is obtained 14 parts of a white solid product containing traces of chlorine by analysis. This solid product is ground to a fine powder with water, filtered, and the operation repeated with dilute aqueous ammonia. The solid product which is now free of chlorine is dried in an oven at 40° C. There is thus obtained 10 parts of poly-2,4-(m-phenylenediamino)-6-phenyl-1,3,5-triazine as a light-brown solid melting at 165° C. and soluble in m-cresol and 99% formic and concentrated sulfuric acids.

Analysis.—Calculated for $C_{15}H_{11}N_5$: N, 27.8%. Found: N, 28.4%.

Example III

A polymerization reactor is charged with an intimate mixture of 5.94 parts of hexamethylenediamine dihydrochloride and 3.93 parts (equimolar proportions based on the dihydrochloride) of acetoguanamine. The reactor is then purged with oxygen-free nitrogen and the mixture heated at 200° C. for six hours in an oxygen-free nitrogen atmosphere. The solid product is isolated and purified as described above in Example II. After drying there is thus obtained 3 parts of poly-2,4-hexamethylenediamino-6-methyl-1,3,5-triazine as a white powder melting at 140–145° C. and soluble in m-cresol, 99% formic acid and concentrated sulfuric acid. Fibers can be melt-spun from this polymer.

Example IV

A polymerization reactor is charged with an intimate mixture of 6.52 parts of acetoguanamine and 9.50 parts (equimolar proportions based on the acetoguanamine) of m-phenylenediamine dihydrochloride. The reactor is then purged with oxygen-free nitrogen and the thoroughly mixed reactants heated for 6 hours at 200° C. under an atmosphere of nitrogen. The solid product obtained is isolated and purified as described previously in Example II. After drying there is thus obtained 8 parts of poly-2,4-(m-phenylenediamino)-6-methyl-1,3,5-triazine as a dark orange solid, soluble in m-cresol, 99% formic acid, and concentrated sulfuric acid. This polymer melts initially at 130–140° C. and then sets up to a solid with some gas evolution, although no ammonia is noticed, and finally softens again at 140–160° C.

It will be understood that the above examples are merely illustrative and that the present invention broadly comprises linear condensation polymers essentially consisting of intrachain 1,3,5-triazine nuclei carrying amino nitrogens in the 2 and 4 positions, and divalent organic radicals joining successive nuclei in the polymer chain through said amino nitrogens in the 2 and 4 positions, and the preparation of such polymers by reacting a 1,3,5-triazine having aminohydrogen-bearing amine groups in the 2 and 4 positions, with an organic compound having at least two aminohydrogen-bearing amine groups, at least one of said compounds being present as a hydrohalide salt.

The linear condensation polymers of this invention are the poly-2,4-diamino-1,3,5-triazines, wherein the 6 position of the triazine nucleus can carry hydrogen or a monovalent hydrocarbon radical of no more than eight carbons; and the two amino nitrogens on the 2 and 4 positions of the triazine ring can carry at most a single hydrogen or a monovalent hydrocarbon radical and are joined together through a divalent organic radical free of Zerewitinoff-active hydrogen. Because they may more readily be prepared and do not offer the possibility of undergoing undesirable cross-linking side reactions during such preparation, the preferred poly-2,4-diamino-1,3,5-triazines are those wherein the substituent in the 6 position of the triazine nucleus, if any other than hydrogen, and those on the nitrogens on the 2 and 4 positions, if any other than hydrogen, as well as the divalent organic radical joining the said nitrogens on the 2 and 4 positions of the triazine nucleus, are solely hydrocarbon and free of aliphatic unsaturation.

Because of the readier availability of the necessary intermediates, the more preferred poly-2,4-amino-1,3,5-triazines are those wherein the various substituents, if any other than hydrogen, in the 6 position of the triazine nucleus and on the nitrogens on the 2 and 4 positions are aliphatic hydrocarbon radicals of no more than four carbons or cycloaliphatic, aromatic, alkaromatic or aralipathic hydrocarbon radicals of no more than eight carbons, and the divalent radical joining the nitrogens on the 2 and 4 positions is hydrocarbon free of aliphatic unsaturation, and usually of no more than twelve carbons. Poly-2,4-dodecamethylenediamino-6(p-tolyl)-1,3,5-triazine, poly - 2,4 - (N,N' - diphenylhexamethylenediamino)-6-cyclohexyl-1,3,5-triazine, poly-2,4-(1',4'-xylylenediamino)-6-benzyl-1,3,5-triazine are preferred polymers, in addition to those in the examples.

These new polymers can be readily prepared by the thermal condensation, preferably under an atmosphere of nitrogen and at temperatures ranging from 100° to 300° C., between essentially equimolar proportions of the requisite 1,3,5-triazine carrying aminohydrogen-bearing amine groups on the 2 and 4 positions, and a polyamine carrying at least two aminohydrogen-bearing amine groups—at least one of the two said reactant types being present as a hydrohalide addition salt. For the preparation of the preferred groups of this new class of polymers, the 2,4-diamino-1,3,5-triazine reactant will have the two amine groups each carrying in addition to the single required hydrogen either another hydrogen or a hydrocarbon radical free of aliphatic unsaturation, and the carbon in the 6 position carrying either hydrogen or a hydrocarbon radical free of aliphatic unsaturation. Specific examples of such 2,4-diamino-1,3,5-triazines include those wherein both the amine groups are primary, such as 2,4-diamino-6-allyl-1,3,5-triazine or, more preferred, 2,4-diamino-6-benzyl-1,3,5-triazine, 2,4-diamino-6-cyclohexyl-1,3,5-triazine; those wherein one of the amine groups is primary and one is secondary, such as 2-amino - 4 - methylamino-1,3,5-triazine, 2-benzylamino-4-amino-6-(p-tolyl)-1,3,5-triazine; those wherein both the aminohydrogen-bearing amine groups on the 2 and 4 positions are secondary such as 2,4-di(methylamino)-1,3,5-triazine, 2,4-di(benzylamino)-6-cresyl-1,3,5-triazine, and the like. Obviously, it is within the scope of this invention to use mixtures of these various 2,4-diamino-1,3,5-triazines, in which case, of course, copolymers will be obtained.

The broad class of amine reactants used in preparing the new polymers of this invention, as has been pointed out previously, are the polyamines containing at least two aminohydrogen-bearing amine groups, i. e., the polyamines carrying at least two primary or secondary amine groups, and which are also free of other Zerewitinoff-active hydrogens and aliphatic unsaturation. Specific examples of such polyamines include diethylenetriamine, triethylenetetramine, 2 - methoxymethyl - 5 - methylhexamethylene-diamine, 2 - hydroxy-1,3-propanediamine, 3-[2(methoxymethoxy) - ethoxy] - hexamethylenediamine, bis-aminopropoxyethane, imino-bis-propylamine, 4,4'-diaminodiphenyl ether, 4,4'-diaminodiphenyl sulfide, 2,6-diaminopyridine, 2,5-diamino-1,3,4-thiodiazole.

Because of the lack of possible cross-linking reactions, the preferred polyamine reactants will contain only two aminohydrogen-bearing amine groups and will be free of both aliphatic unsaturation and Zerewitinoff-active hydrogens, with the most preferred members of this class being those which, other than the two aminohydrogen-bearing amine groups, are solely hydrocarbon free of aliphatic unsaturation. Specific examples of this class of preferred polyamines include the saturated aliphatic diamines, e. g., ethylenediamine, 1,3-propanediamine, decamethylenediamine, 1,2 - butanediamine, N,N' - dimethylhexamethylenediamine, N - ethylhexamethylenediamine, N,N'-dipropyldecamethylenediamine; aromatic diamines, e. g., p-phenylenediamine, 1,4-anthradiamine, 1,4-naphthalenediamine, 3,4-biphenyl-diamine; araliphatic diamines, p-aminobenzylamine, bis (4-aminophenyl) methane, 1,2-bis-(4-aminophenyl) ethane; cycloaliphatic diamines, e. g., 1,4-cyclohexanediamine, 4,4'-diaminodicyclohexane, N,N' - dimethyl - 1,4 - cyclohexanediamine; cycloaliphatic/aliphatic diamines, di-p-aminocyclohexylmethane, di-p-aminocyclohexylethane, and the like. As is the case with the triazine reactants, it is obviously within the scope of this invention to use mixtures of more than one of the above defined diamines, in which case, of course, copolymers will be prepared, i. e., the intrachain 1,3,5-triazine nuclei will be linked by different divalent radicals.

The condensation reaction between the 2,4-diamino-1,3,5-triazines and diamino hydrogen containing polyamines will be normally carried out at temperatures in the range of 100° C.–300° C., preferably in the absence of oxygen. The latter condition, while not necessary, leads to the production of polymers of improved color since oxidative degradation at the temperatures involved for both types of complementary reactants is known to lead to undesirable colored by-products. The condensation reaction is normally carried out in this temperature range for periods of from 2 to 12 hours or longer. However, reaction times appreciably greater than 24 hours lead to no gross improvements in degree of polymerization and the polymer properties dependent thereon, and in fact tend to promote thermal degradation of the polymer formed. Accordingly, reaction times greater than 24 hours are not preferred. For similar reasons, although reaction temperatures greater than 300° C. can be used, they are not preferred. The most preferred range of operating conditions leading to the production of polymers in the desired molecular weight range, i. e., polymers adapted to be formed into films and fibers, with the minimum of oxidative and thermal decomposition and degradation products involves temperatures in the range 150° C.–250° C. for periods of from 2 to 12 hours under an atmosphere of nitrogen. The condensation is normally carried out at atmospheric pressure, although superatmospheric pressures can obviously be used. However, no advantages have been found to accrue therefrom.

The reaction vessels used can be fabricated from any suitable material capable of withstanding the operating temperatures involved and will include the standard reaction vessels fabricated from the various metals and/or glass. For reasons of probable undesirable side reactions, particularly the catalytic effect in thermal degradation brought about by traces of certain metals at the relatively high operating temperatures involved, the reaction vessels will be preferably fabricated from glass or the more resistant metals such as stainless steel, the chrome-molybdenum iron alloys, the noble metal lined steel reactors, as well as the glass lined vessels, and the like.

At least one of the complementary reactants involved in the polymer forming reaction must be present as a hydrohalide addition salt, including the hydrofluoride, hydrochloride, hydrobromide, and hydroiodide addition salts. For reasons of greater availability and appreciably lower costs, the hydrochloride addition salts are preferred. The mechanism of the condensation reaction is not completely understood, but it is believed that the two complementary polymer-forming reactants must together have available in their structures one and only one molecule of the hydrohalide for each polymer link formed, i. e., that on a molar basis the condensation polymerization between equimolar proportions of one 2,4-diamino-1,3,5-triazine having both amine groups hydrogen-bearing and one polyamine having at least two aminohydrogen-bearing amine groups requires the presence of two moles of a hydrohalide or, stated otherwise, one mole of hydrohalide per each mole of the reactants. This means that one mole of the dihydrohalide of the polyamine can be condensed with one mole of the diaminotriazine, and, conversely, that one mole of the dihydrohalide of the diaminotriazine can be condensed with one mole of the polyamine containing two aminohydrogen-bearing amine groups. It is also within the scope of this invention to condense equimolar proportions of the half hydrohalide salts of each reactant, i. e., equimolar proportions of a monohydrohalide of one of the 2,4-diamino-1,3,5-triazines and a monohydrohalide of one of the diaminohydrogen-bearing polyamines.

The new polymers of this invention are useful in the preparation of films and fibers, either by the conventional melt-pressing and melt-spinning techniques or by the equally conventional solvent-casting and wet-spinning procedures well known in the art. Because of the relatively long times at which polymers must be maintained in the melt condition during a melt-spinning process such as is conventionally employed with the dibasic acid/diamine type polyamides, it is preferred for the formation of fibers from the polymers of the present invention to use wet-spinning procedures, since these polymers do undergo some thermal degradation on long-term melt exposure. Suitable solvents for handling these polymers include phenols, e. g., m-cresol; strong organic acids, e. g., 99% formic acid; certain strong mineral acids, e. g., concentrated sulfuric acid.

These polymers in film or fiber form, especially the latter, are particularly outstanding because of their ready dyeability and ease of susceptibility to the normally used aqueous processing techniques. They are also capable of further modification through the reactive centers of the triazine nucleus.

As many apparently widely different embodiments of this invention may be made without departing from the spirit and scope thereof, it is to be understood that the invention is not limited to the specific embodiments thereof except as defined in the appended claims.

The invention claimed is:

1. A linear condensation polymer adapted to be formed into films and fibers, said polymer essentially consisting of intrachain units having the structural formula:

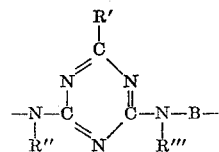

wherein the R's are from the group consisting of hydrogen and monovalent hydrocarbon radicals free of alphatic unsaturation and of no more than eight carbons each and B is a divalent hydrocarbon radical free of aliphatic unsaturation and of no more than twelve carbons.

2. Process which comprises reacting at a temperature of about 100° C. to 300° C. in substantially equimolar proportions a 1,3,5-triazine of the formula:

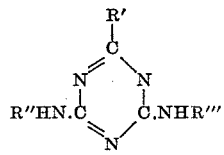

wherein the R's are from the group consisting of hydrogen and monovalent hydrocarbon radicals free of aliphatic unsaturation and of no more than eight carbons, with an organic compound having two aminohydrogen-bearing amine groups and which, other than said groups, is a hydrocarbon free of aliphatic unsaturation and of no more than twelve carbons, a hydrochloride being present as an addition salt of at least one of the reactants and in a proportion of one mole per each mole of the reactants.

3. A process as set forth in claim 2 wherein the reaction is carried out under an atmosphere of nitrogen at a temperature of 150° C. to 250° C. for a period of 2 to 12 hours.

4. Poly-2,4-hexamethylenediamino-6-phenyl-1,3,5 - triazine.

5. Poly-2,4-(m-phenylenediamino) - 6 - phenyl - 1,3,5-triazine.

6. Poly-2,4-hexamethylenediamino - 6 - methyl - 1,3,5-triazine.

7. Poly-2,4-(m-phenylenediamino) - 6 - methyl - 1,3,5-triazine.

References Cited in the file of this patent

UNITED STATES PATENTS 2,467,523     Dudley _____ Apr. 19, 1949